OR  3,840,287

United States
Witzke et al.

[11] 3,840,287
[45] Oct. 8, 1974

[54] SYMMETRICAL ELECTROCHROMIC CELL
[75] Inventors: Horst Witzke; Stephen Eugene Schnatterly, both of Princeton, N.J.
[73] Assignee: Optel Corporation, Princeton, N.J.
[22] Filed: July 30, 1973
[21] Appl. No.: 384,052

[52] U.S. Cl. .............................................. 350/160 R
[51] Int. Cl. .............................................. G02f 1/36
[58] Field of Search .............................. 350/160 R

[56] References Cited
UNITED STATES PATENTS
3,708,220  1/1973  Meyers et al. ............... 350/160 R

*Primary Examiner*—Vincent P. McGraw
*Attorney, Agent, or Firm*—Joel F. Spivak

[57] ABSTRACT

An electrochromic cell having an essentially symmetrical type of structure such as a cell comprising an electrochromic material, a color assisting agent, a second electrochromic material and a second electrode in a layer type structure wherein at least one of said electrochromic materials is in its colored state prior to use of the device.

6 Claims, 1 Drawing Figure

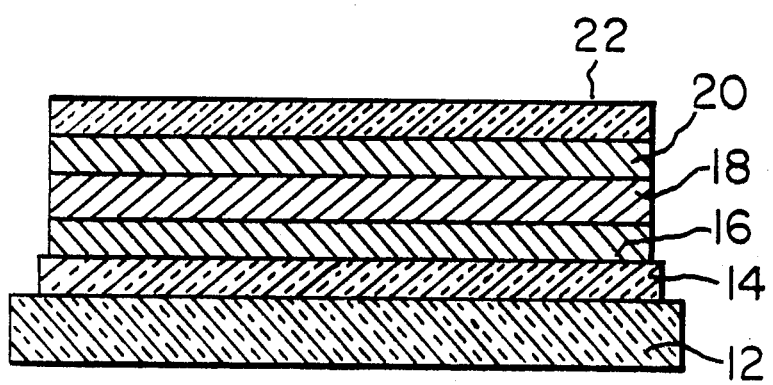

SYMMETRICAL ELECTROCHROMIC CELL

BACKGROUND OF INVENTION

This invention relates to electrochromic devices wherein the electromagnetic transmission characteristics may be reversably altered by a property controlled electric field.

M. D. Meyers, in U.S. Pat. 3,708,220 has described a device which consists of an electrochromic material in contact with a semi-solid electrolyte gel sandwiched between a pair of electrodes. Meyers also discloses an apparently symmetrical structure consisting of a first electrode, a tungsten oxide electrochromic layer, a semi-solid electrolyte gel, a second tungsten oxide layer stated as being the counter electrode and a top transparent electrode. We have discovered that a symmetric structure of the type described above cannot readily be colored when both electrochromic layers are in their colorless state. This is especially true when both electrochromic layers are of the same material, such as tungsten oxide. In such a case, essentially no current will flow (a colorless tungsten oxide film is insulating) and therefore essentially no coloration will take place since current flow is required for coloration. We have discovered that one way to make the cell readily respond to an applied D.C. voltage so as to effect a color change in the layers is to start with an unbalanced cell. That is, to start with a cell in which one of the electrochromic layers is in its colored state such that current can flow through this layer.

SUMMARY OF INVENTION

An electrochromic device comprising between electrodes, first and second layers of electrochromic material having a color promoting agent permeable means there between, said means being opaque, and at least one of said electrochromic layers being in its colored state.

BRIEF DESCRIPTION OF DRAWING

The sole FIGURE is an elevational cross sectional view of a novel embodiment of the invention.

DETAILED DESCRIPTION OF INVENTION

Referring to the FIGURE, there is shown a typical structure of a novel symmetrical electrochromic device. The device 10 comprises, in a layered type structure, a support plate 12 which supports the thin layers of the device, a first electrode 14 on said support plate 12, a first electrochromic layer 16 on said first electrode 14, a layer which includes a color promoting or assisting agent 18 on said first electrochromic layer 16, a second electrochromic layer 20 on said layer 18 and a second electrode layer 22 on said second electrochromic layer.

A typical cell can be represented as shown below:
$SnO_2/WO_3/$Color Assisting Agent$/WO_3/SnO_2$
In this representation $SnO_2$ represents a conductive tin oxide layer and $WO_3$ represents an electrochromic tungsten oxide layer. Therefore, in the cell depicted by the above representation, we have a symmetrical sandwich employing two tin oxide outer electrodes, two tungsten oxide electrochromic layers and a central layer of a color assisting agent which may be for example an opaque acid, an opaque electrolyte gel or a solid opaque layer such as a layer of palladium or platinum having associated therewith a coloring assisting agent such as hydrogen.

If A is the face of the cell to be used as a display and is completely colorless, and B is also completely colorless, essentially no current will flow through the cell and A will not be colored by the application of an electric field across the electrodes 1 and 2.

If B is colored before the cell is completed by either electrolytic means, chemical means or by ultra violet radiation then, A can be colored upon the application of a field of the proper polarity since B will be bleached while A is being colored and current will be allowed to flow when electrode 1 is made negative and electrode 2 is made positive. Current flow will stop when B is completely colorless. The more color centers that are introduced into B before the cell is constructed, the more color centers can be induced into A during operation of the device and therefore the greater the contrast ratio that may be obtainable. It should be noted that B does not have to be colored before construction of this cell. Ultraviolet radiation of face B can be done after construction of the cell to make the cell operative.

It should be realized that as an alternative to initially coloring B before operation of the cell one can initially color A instead of B. Also, although not preferred, both faces may be colored prior to operation of the device in order to make the device operative.

As another alternative, the center layer may simply be an ion permeable layer which is permeable to the ions which promote coloration in the pre-colored layer. The term "color promoting agent" is used herein since it is believed that the source of coloration is actually electrons but positive ions are required as charge compensators in order to obtain a device that can be substantially colored so as to be useful.

The novel invention also contemplates devices in which a catalyst is added at the interface between the electrochromic materials and the central layer of the cell. The addition of such a catalyst will tend to increase the flow rate of ions across the center of the cell and from one electrochromic layer to the other thereby decreasing the time necessary for coloration or bleaching of the cell. In addition, the term "symmetric" as used herein also applies to cells wherein there is a modification of a surface of a layer or where there is introduction of impurities into any layer.

Where the novel device is to be used as for example, a numeric display device, either the electrode or the electrochromic material to be viewed will be formed in a segmented pattern as is well known in the display art.

Only the electrode on the face or viewing side of the device need be transparent. If, however, both electrodes are transparent as well as the support layer, the cell can be viewed from both sides.

An important feature of the device is that the color promoting or assisting agent layer be opaque and also that it be permeable with respect to the ions which promote or assist coloration. If this layer was not opaque, one could not discern the change of color state of one of the electrochromic layers due to the fact that the other electrochromic layer could be seen at the same time and while one layer becomes lighter, the other layer becomes darker and the combination of the two layers if both were observable would apparently have no or little color change. The requirement that the central layer be permeable to the ions which promote coloration is also essential to operation of the device otherwise ions could not flow from one electrochromic layer to the other electrochromic layer. Where the central layer is an acid such as sulfuric acid or an electrolyte gel as disclosed in the Meyers patent, these layers can be made opaque by using standard techniques such as making the acid layer viscous by adding glycerine or thixotropic agents to the acid or other electrolyte material and then adding an ocacifying agent. Examples of such thixotropic agents are Cabosil, and gel forming agents such as PVA. Opacifying agents include for example titanium dioxide. Electrodes other than tin oxide, and electrochromic materials other than tungsten oxide are also suitable. Reference can be made to the Meyers patent for other electrochromic materials.

What is claimed is:

1. An electrochromic device comprising between electrodes, first and second layers of electrochromic material having an opaque, ion permeable color assisting agent containing layer therebetween and at least one of said electrochromic layers being in its colored state.

2. The device recited in claim 1 wherein said electrochromic material consists of tungsten oxide and wherein at least one of said electrodes is transparent.

3. The electrochromic device recited in claim 1 wherein one electrochromic layer is in a first electromagnetic absorption state while the other electrochromic layer is in a different electromagnetic absorption state.

4. The device recited in claim 1 wherein said ion permeable layer comprises sulfuric acid.

5. The device recited in claim 4 wherein said sulfuric acid is in the form of a semi-solid electrolyte gel.

6. The device recited in claim 1 wherein said ion permeable layer comprises a member of the group consisting of platinum, palladium and rhodium and wherein said member has hydrogen associated therewith.

* * * * *